Oct. 29, 1968    R. D. BLUE ETAL    3,408,232
BROMINE-ZINC SECONDARY CELL
Filed July 6, 1965    2 Sheets-Sheet 1

INVENTORS.
Robert D. Blue
James J. Leddy
BY Earl D. Ayers
AGENT

Oct. 29, 1968

R. D. BLUE ETAL 3,408,232

BROMINE-ZINC SECONDARY CELL

Filed July 6, 1965

INVENTORS.
Robert D. Blue
James J. Leddy

BY Earl D. Ayers

AGENT

United States Patent Office 3,408,232
Patented Oct. 29, 1968

3,408,232
BROMINE-ZINC SECONDARY CELL
Robert D. Blue, Midland, and James J. Leddy, Saginaw, Mich., assignors to The Dow Chemical Company, Midland, Mich., a corporation of Delaware
Filed July 6, 1965, Ser. No. 469,811
13 Claims. (Cl. 136—30)

This invention relates to bromine-zinc secondary cells and particularly to such secondary cells which utilize an organic solvent for bromine in conjunction with the cell electrolyte.

Bromine-zinc storage batteries are old in general concept, but little work has been done in this field.

One of the problems of prior art bromine-zinc secondary storage cells has been the formation of non-galvanic zinc bromide during the life of the cell.

However, the need for a means for storing electrical energy in an efficient manner has resulted in renewed investigation of this type of storage cell.

Accordingly, a principal object of this invention is to provide an improved bromine-zinc secondary storage cell.

Another object of this invention is to provide an improved, more efficient bromine-zinc secondary storage cell.

A further object of this invention is to provide an improved bromine-zinc secondary cell having a good stored power to weight ratio.

In accordance with this invention there is provided a bromine-zinc secondary cell comprising a zinc electrode, a porous carbon electrode, an aqueous electrolyte of zinc bromide and a soluble conducting salt such as sodium chloride, for example, together with a water insoluble liquid such as carbon tetrachloride, for example, which is capable of adsorbing elemental bromine from the aqueous phase.

On the charge cycle zinc is deposited on the zinc electrode and elemental bromine is liberated at the porous carbon electrode and subsequently adsorbed into the organic solvent phase.

On the discharge cycle zinc bromide is reformed with the generation of power. During this cycle the bromine diffuses from the organic solvent phase and on to the porous carbon electrode face where it acts as depolarizer or hydrogen ion combustor.

The invention, as well as additional objects and advantages thereof, will best be understood when the following detailed description is read in connection with the accompanying drawings, in which.

Figure 2:
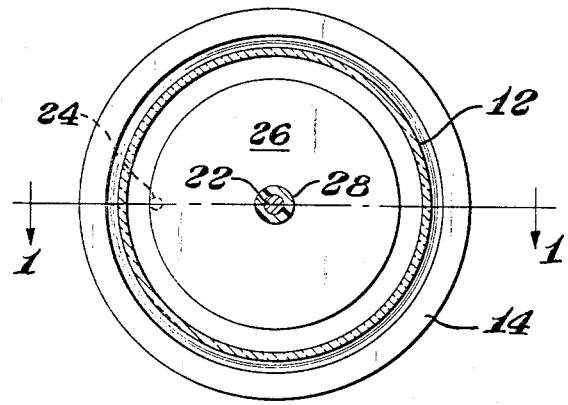
FIG. 2 is a sectional view taken along the line 2—2 of FIG. 1.
Figure 1:
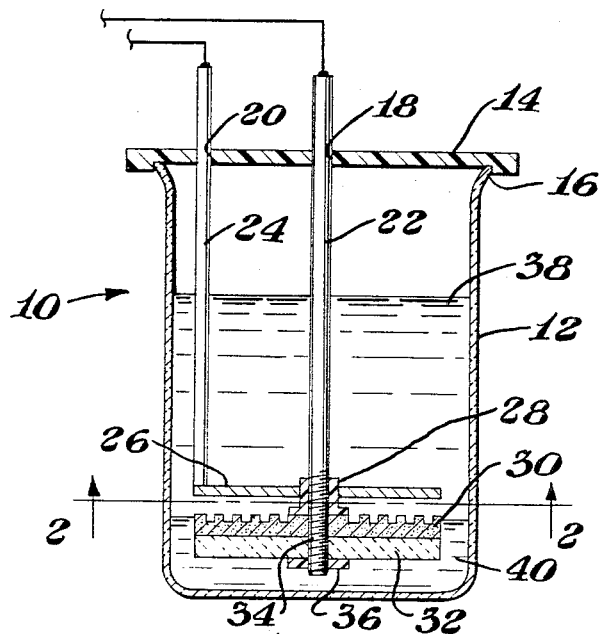
FIG. 1 is a sectional elevational view of a secondary cell in accordance with this invention.

Referring to the drawings, there is shown in FIGS. 1 and 2, a secondary cell 10 comprising a fluid tight container 12 having a cover 14 enclosing its open end 16. A centrally axially disposed electrode lead and support rod 22 extends through a bore 18 in the cover 14 and is supportable from the cover 14. The lower end of the rod 22 contains threads 34.

A spacer-separator bushing 28, made of an electrically insulating material which is not subject to attack by the cell fluids is threaded onto the lower end of the rod 22.

A plate-like porous carbon electrode 30 having ridges on its upper surface and an axial bore extending through the central part thereof is fitted over the rod 22 and abuts against the spacer 28.

A plate-like element 32, composed of graphite, is fitted over the end of the rod 22 and abuts against the surface of the electrode 30 which is opposite the surfaces having the ridges.

The electrode 30 and element 32 are fixed in position along the rod 22 by means of the nut 36 which engages the threads 34.

A plate-like zinc electrode 26 having a centrally disposed bore therein is threaded over the rod 22 and separated therefrom by the bushing 28. A support and lead element 24, extending through a bore 20 in the cover 14, is provided.

The container 12 contains an organic solvent 40 for bromine, such as carbon tetrachloride, for example, to a level just below the top of the porous carbon electrode 30. The container is then filled with electrolyte 38 to a level above the zinc electrode.

In one example of battery as shown in FIGS. 1 and 2 the electrodes are disposed horizontally, are 2 inches in diameter and spaced ¼ inch from each other. The graphite disc is disposed against the porous carbon electrode primarily to increase conductivity between the electrode 30 and the rod 22.

In operation, with an aqueous electrolyte containing 50 grams of sodium chloride per liter (65 cubic centimeters of NaCl solution used in this cell), 65 cubic centimeters of carbon tetrachloride or bromoform as the organic solvent, and 15 grams of bromine, the cell gave, in short term use, ampere hour efficiencies of from 55% to 75%.

Figure 3:
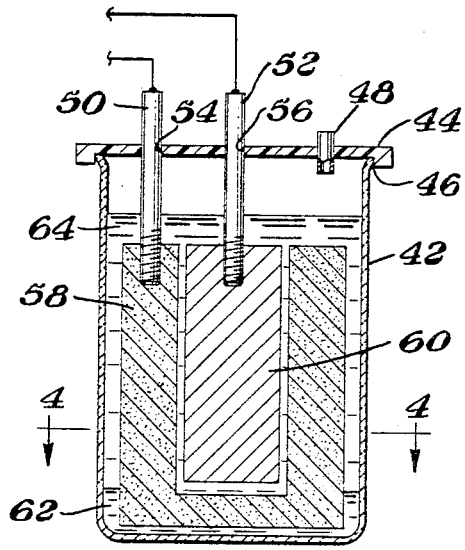
FIG. 3 is a side elevational view, in section, of another embodiment of cell in accordance with this invention.
Figure 4:
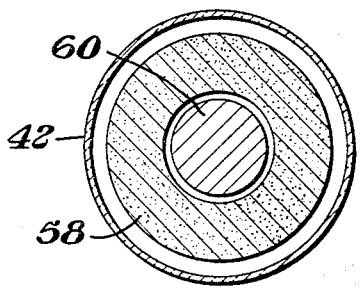
FIG. 4 is a sectional view taken along the line 4—4 of FIG. 3.

Another embodiment of bromine-zinc secondary cell is shown in FIGS. 3 and 4, in which the electrodes are disposed vertically. In the cell of FIGS. 3 and 4, the casing 42 and cover 44 are the same, for example, as in the cell shown in FIGS. 1 and 2 except that a vent 48 is shown in the cover 44 in event the cover fits tightly over the top 46 of the casing 42.

The porous carbon electrode 58 has a hollow cylindrical configuration with one closed end and surrounds the cylindrically shaped zinc electrode 60. The electrodes 58, 60 are supported within the casing 42 by lead rods 60, 62, respectively, which extend through bores 54, 56 in the cover 44.

Organic solvent 62 for bromine is disposed in the casing to a level above the bottom of the porous carbon electrode 58 but below the bottom of the zinc electrode 60. The casing is then filled with electrolyte of the same type, for example, as mentioned in connection with the cell in FIG. 1, to a level above the top of the electrodes 58, 60.

Figure 5:
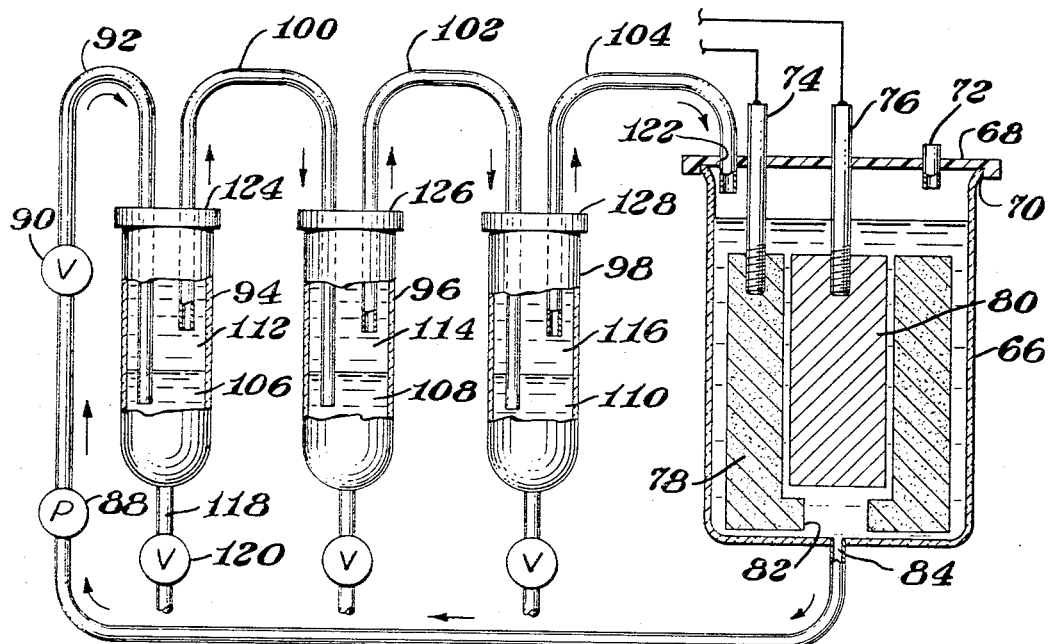
FIG. 5 is a side elevational view of a secondary cell in accordance with this invention which has organic solvent for bromine disposed in containers external of the cell structure which contains the electrodes.

A somewhat more sophisticated embodiment of cell in accordance with this invention is shown in FIG. 5.

In FIG. 5, the casing 66 and cover 68, as in the cell shown in FIG. 3, fit together tightly at the top 70 of the casing. The leads 74, 76 and vent 72 are as in the cell of FIG. 3.

The porous carbon electrode 78 is a cup shaped hollow cylindrical element having a bore 82 in the closed bottom end thereof. The cylindrical zinc electrode is telescoped within and spaced from the porous carbon electrode. The casing is filled with electrolyte above the top of the electrodes.

The casing 66 has a bore 84 in its bottom part which has a conduit 86 coupled thereto.

The conduit 86 is coupled to a pump 88 and valve 90. The valve 90 is coupled through a U-shaped tube 92 to an organic solvent-electrolyte reservoir 94.

The solvent reservoir 94 comprises a tubular container having an open upper end which is covered by a close fitting, sealed cap 124. A drain line 118 having a valve 120 is coupled to the bottom end of the reservoir 94. The lower part of the reservoir 94 contains an organic solvent for bromine, while the upper part contains electrolyte. The tube 92 extends well into the organic solvent. Other solvent reservoirs 96, 98 are series connected between the reservoir 94 and the casing 66.

The reservoirs 96, 98 each contain covers 126, 128 respectively which are like the cover 124 of reservoir 94. The organic solvent 108, 110 and electrolyte 114, 116 in reservoirs 96, 98 are at about the same levels as in reservoir 94.

A U-shaped tube 100 extends from the electrolyte of the reservoir 94 into the organic solvent 108 of reservoir 96. A tube 102 extends from the electrolyte 114 of reservoir into the organic solvent 110 of reservoir 98, while a tube 104 extends from the electrolyte of reservoir 98 through a bore 122 in the cover 68 and thence into the cell casing 66.

In the arrangement of FIG. 5, the electrolyte system is circulated and also the organic solvent may be remotely located from the electrodes of the cell.

The organic solvent used should have a relatively high extraction coefficient for bromine against an aqueous medium (or against the electrolyte phase) and also be non-reactive towards bromine.

Examples of organic solvents are bromobenzene, x-dibromobenzene, chlorobenzene, dibromochloromethane, bromotrichloromethane, carbon tetrachloride, 1,1,2,2-tetrachlorethane, and methyl dibromide.

A preferred aqueous phase electrolyte formulation has 110 grams per liter of sodium chloride and 140 grams per liter of $Zn(BF_4)_2$.

Other good aqueous phase electrolyte formulations are: 150 grams/liter of NaCl and 10 grams/liter $K_2SO_4$; 300 grams/liter of NaCl, 30 grams/liter $ZnBr_2$ and 3 grams/liter $HgCl_2$; 110 grams/liter of $Na_2SO_4$ and 140 grams/liter $Zn(BF_4)_2$; 100 grams/liter $NaNO_3$ and 140 grams/liter $Zn(BF_4)_2$ or 75 grams/liter $Zn(BF_4)_2$ and 30 grams/liter of $ZnBr_2$.

In connection with the porous carbon electrodes of the cells, it has been found that ½ inch thick, fine pored (.0013 inch diameter pores) electrodes were preferable (gave better ampere hour efficiencies in use) over thinner or coarser pored electrodes.

What is claimed is:

1. A bromine-zinc secondary cell comprising: a case, a zinc electrode and a porous carbon electrode, said electrodes being spaced apart and disposed within said case, and an alectrolyte system comprising a first layer of a water-insoluble organic liquid having elemental bromine dissolved therein and a second layer comprising an aqueous conducting salt solution containing zinc bromide, said second layer disposed above and in contact with said first layer, said layers being in the quiescent state at least at the time of the initial operation of said cell, said electrolyte system covering at least a part of each electrode.

2. A cell in accordance with claim 1, wherein said water insoluble organic liquid contacts said porous carbon electrode.

3. A cell in accordance with claim 1, wherein the water insoluble organic liquid phase of said electrolyte system is disposed externally of said case and means are provided for circulating said aqueous phase through said water insoluble liquid phase.

4. A cell in accordance with claim 1, wherein said aqueous salt solution comprises a sodium salt and zinc tetrafluoroborate.

5. A cell in accordance with claim 1, wherein said water insoluble organic liquid is a halohydrocarbon from the group consisting of bromobenzene, x-dibromobenzene, chlorobenzene, dibromochloromethane, bromotrichloromethane, carbon tetrachloride, 1,1,2,2-tetrachlorethane, and methylene dibromide.

6. A cell in accordance with claim 1, wherein said electrodes are completely covered by said electrolyte system.

7. A cell in accordance with claim 1, wherein said aqueous salt solution contains about 110 grams per liter of sodium chloride and about 140 grams per liter of zinc tetrafluoroborate.

8. A cell in accordance with claim 1, wherein said electrodes are plate-like in configuration.

9. A cell in accordance with claim 1, wherein said porous carbon electrode is cup shaped and said zinc electrode is telescoped therein.

10. A cell in accordance with claim 1, wherein said pore size of porous carbon electrode is smaller than .0023 inch and said electrode is at least one half inch thick.

11. A cell in accordance with claim 1, wherein said aqueous salt solution comprises zinc tetrafluoroborate and zinc bromide.

12. A cell in accordance with claim 1, wherein said aqueous salt solution comprises a sodium salt and potassium sulphate.

13. A cell in accordance with claim 1, wherein said aqueous salt solution comprises a sodium salt, and mercury bichloride.

References Cited
UNITED STATES PATENTS

| | | | |
|---|---|---|---|
| 2,441,896 | 5/1948 | Moir | 136—154 |
| 2,708,242 | 5/1955 | Ruben | 136—103 X |
| 3,019,279 | 1/1962 | Blue et al. | 136—103 |
| 3,285,781 | 11/1966 | Zito | 136—30 X |

ALLEN B. CURTIS, *Primary Examiner.*